C. HERRMAN.
FOLDING RULE.
APPLICATION FILED MAR. 11, 1918.
1,372,691.
Patented Mar. 29, 1921.
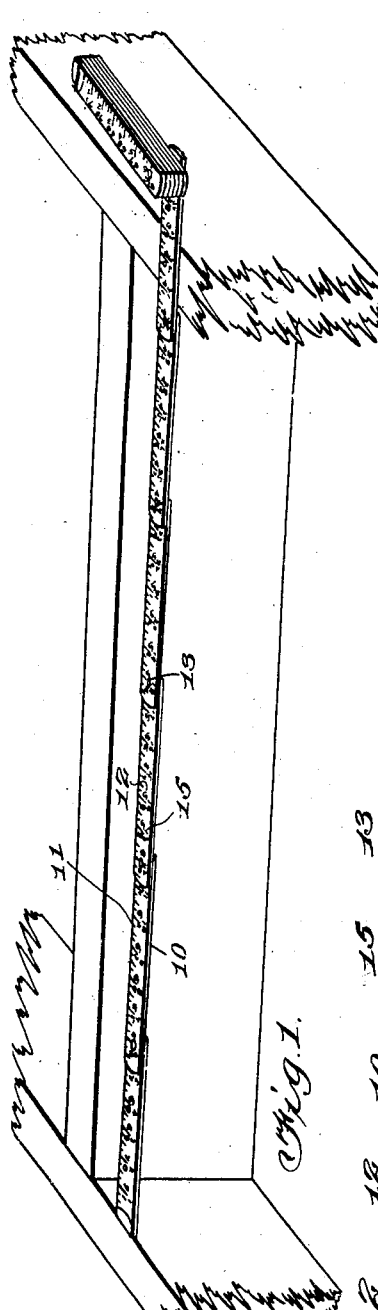
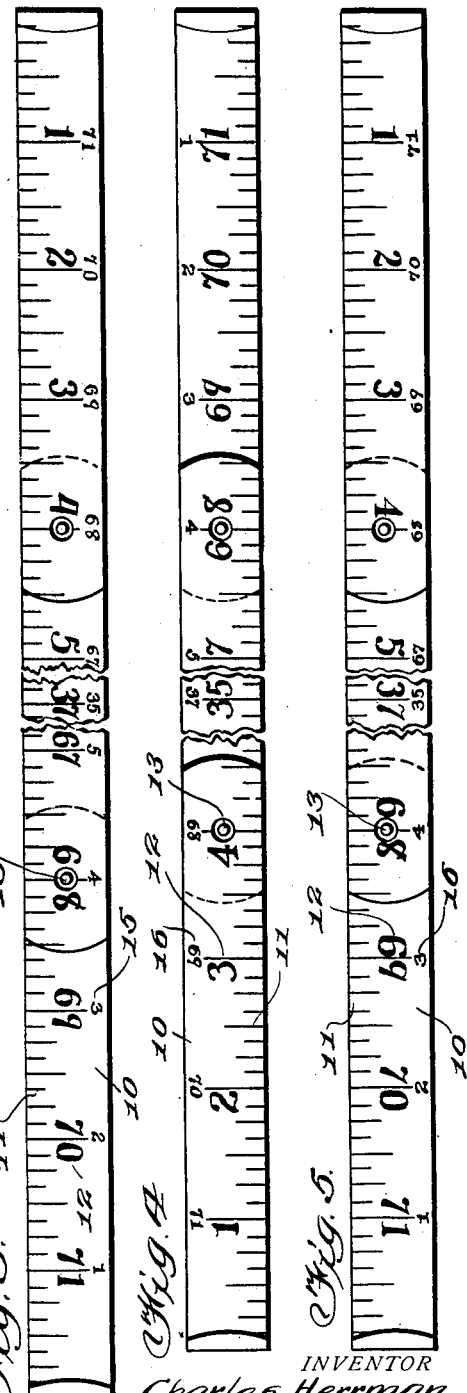
INVENTOR
Charles Herrman,
BY
ATTORNEYS
WITNESSES:

UNITED STATES PATENT OFFICE.

CHARLES HERRMAN, OF NEW YORK, N. Y.

FOLDING RULE.

1,372,691.  Specification of Letters Patent.  Patented Mar. 29, 1921.

Application filed March 11, 1918. Serial No. 221,810.

*To all whom may concern:*

Be it known that I, CHARLES HERRMAN, a citizen of the United States, residing at New York, in the county of New York and State of New York, have invented certain new and useful Improvements in Folding Rules; and I do hereby declare the following to be a full, clear, and exact description of the invention, such as will enable others skilled in the art to which it appertains to make and use the same.

This invention relates to improvements in rule markings and, more particularly, to the indicia on a folding rule.

It has for an object to facilitate and insure the easy and correct reading and calculation of distances by assisting in the determination of the particular end of the rule from which the measurement is made.

A further object of this invention is the provision of a rule marking which tends to check up any possible miscalculation in mistaking the end of the rule from which the numerical progression of the unitary graduations is numbered.

In considering the elemental and axiomatic fundamentals of this invention, it should be borne in mind that, unlike a machinist's measuring scale which, in its very nature, presupposes a certain degree of skill, care and concentration on the preceise piece immediately in hand, the folding rule is a universal tool, used by the skilled and the unskilled; and further, the able and skilled, visioning in the mind the broader aspects and larger details of the undertaking, too often, give but secondary thought to the measure immediately in hand. They invert the folding rule incorrectly; fail to fully unfold it; being habituated to the use, through ownership, of say, a five-foot rule they borrow a six-foot rule and, in momentary abstraction, cheerfully proceed to reckon up on the basis of a five-foot rule.

In view of the foregoing and with other objects, which will be apparent from the specification, appended claims and drawings, I have provided for jointed folding rules and sectional slide rules, having only one graduated edge on each face, an improved indicia marking; and the principles of this invention may be readily and economically incorporated in said rules without structural alteration or deviation from the usual proportions thereof. And, as will hereinafter clearly appear, the longer the rule—that is the more sections or folds it has—the more useful this improved indicia.

In the drawings,

Figure 1 is a perspective view showing a rule of this extensible type in use,

Fig. 2 is a plan view of the obverse face illustrating one style of the improved indicia marking for extensible rules as applied to a, in this instance, six-foot rule, Fig. 3 is a similar view of the reverse side, Fig. 4 is a plan view of the obverse face of an extensible rule, pivotal-folding type, illustrating another style of marking, and Fig. 5 is a similar view of the reverse face thereof.

It will be seen that in addition to the usual graduations at one edge only there has been provided a secondary set of indicia, relative to the unitary graduations and the multiples thereof, at the other edge; and, intermediate of these so marked edges, in a plane somewhat median to the rule's width, a primary, major indicia set has been placed.

I have provided two separate sets of indicia for the unitary graduations and the multiples thereof. As may readily be seen, each set as an entirety and by the direction of progression of the respective unitary multiples is suggestive of direction of measurement; identifies direction of progression and, hence, calculation; and is, for purposes of check and correction, suggestive of comparative distance as from the rule's end.

Of the two sets of indicia, one—the median plane set, hereinafter referred to as "primary, major"—is measure; and the other—at the edge opposite the graduations and hereinafter denoted as "secondary, minor"—is a check, corrective, contra-distinctive secondary measure, and is inherently suggestive of comparative distance and multiple of the unitary dimension from one end of a rule and also identifies direction of progression.

The minor set is formed in a distinctive manner, of a contrasting color, and, particularly, of a considerably differing—smaller—size, or any combination of the foregoing distinctive features. Both the major and minor indicia may also be formed of a type which is in itself antagonistic to mistaken inversion—6, 8, 9 throughout the drawings are such—and, are distinctive to identify, so to speak, a single reading angle. The other Arabic numerals—1, 2, 3, 4, 5, 7 and the cipher 0 are inherently properly readable only from one viewpoint.

Referring more specifically to the drawings, 10 indicates a rule having the graduations 11 formed adjacent to one edge thereof, and the unitary graduations, such as the inches, are identified by the major indicia 12 directly relative thereto.

This rule is shown with the joints 13 at four-inch intervals but, it is evident, that these joints may be at any other desired spacing. And, as the sectional lengths, jointings, pivotal connections and slide—enabling devices may vary without materially affecting the application of this invention, I wish it understood as applying to all such under the broad term "extensible rule".

The rule shown in the drawing has the first major indicia, 1, at the left-hand end of the rule for either the obverse or reverse face for usage, but the principles may be incorporated equally as well in that type of rule which has the numerical progression of the major indicia on the obverse and reverse face beginning at the same end of the rule.

The transverse lines indicating the unitary graduations are also provided with the secondary, minor indicia shown in Figs. 2 and 3 by the reference numeral 15 and in Figs. 4 and 5 by the reference numeral 16.

In Figs. 2 and 3, the minor indicia are shown as readable from the same viewpoint as the major indicia. In Figs. 4 and 5, the minor indicia are shown in inverted position with respect to the major indicia. The numerals of the minor indicia are properly made in distinctive form so as to accentuate their utility in checking end-rule mistaken inversion, miscalculation, and incomplete extension or unfolding of the rule; and, of prime importance, the minor indicia should be of a considerably smaller size than the major, so that each may be of a size comparative to its usage value and that there may be no conflicting similarity.

Referring to Figs. 2, 3, 4 and 5, it will be noted that, as from a proper reading viewpoint the major indicia always start at the left-hand end of the rule and have an ascending numerical progression to the right-hand end; the minor indicia, as from the correct reading viewpoint for the major indicia, always start at the right-hand end and have an ascending numerical progression to the left-hand end—that is, as between the major and minor indicia there is an oppositional numerical progression.

In Figs. 4 and 5, in addition to size divergence and oppositional progression, the minor indicia numerals are inverted as from a correct viewpoint of the major indicia.

It will also be noted that at each of the unitary graduation lines the major indicia of one face of the rule are equal in value to the minor indicia of the opposite rule face at that same unitary line; and so, likewise, is the minor indicia value of the one face unitary graduation equal to the major indicia value of the other face. This, at times, obviates the need for turning the rule flatwise; and, at other times, obviates the need for rule-end reversal, thus doing away with excessive manipulation.

It may further be noted that the sum of the combined values of the major and minor indicia of any one side of the rule at each and every unitary graduation is always equal in value to the entire rule length. We have thus, concretely, at all unitary lines, without the need for extreme rule-end reference, the readily available total of the entire rule length.

It may further be noted that the initial unit, 1, of the major indicia is at all times juxtapositioned by a minor indicia of a value one unit less than the entire rule length. For example, in all the illustrative rule depictions herewith, the major 1 is juxtapositioned by the minor 71. We have thus, concretely, at all ends an indicia, either major or minor, suggestive, within one unit, of the entire length of the rule. The usefulness of this is obvious.

No reference numerals have been used in connection with the above as these features, inherent in the invention, are so very clearly self-evident on the drawings.

And, further, if a measure be taken from the end of the rule to a given major indication, and the remaining rule length value be desired, the minor indicia in direct juxtaposition to the given major indicia is at all times equal to the desired value. For example, in Fig. 2, assuming 35 is the given major indicia then the minor indicia 37 is the desired remainder of total rule length. The need for subtraction, with its accompanying possibility of error, is thereby entirely eliminated in all such cases.

By referring to the central portions of Figs. 2, 3, 4 and 5, it will be noted that the values 35 and 37 of the major and minor indicia are of approximately the same quantity, and therefore when the rule is in use and for the purpose of avoiding confusion or mistake when reading the scales or indices at the central portion of the length of the rule when either of its ends is being utilized as a base from which to compute, it is especially desirable that the major and minor indicia be particularly characterized or distinguished so as to obviate the chance of reading the scale number on the wrong indicia. Therefore, to enhance the accuracy and use of the scale and minimize the possible error, the minor indicia in Figs. 3 and 4 are shown as inverted with respect to the major indicia so that the numbers 35 and 37, while of approximately equal value, clearly could not be mistaken one for the other by reason of their location at the central portion of the rule when either of its ends are used as bases.

It is obvious, in view of the foregoing, that this type of marking has many superior advantages over the present marking for extensible rules and it may readily be adapted to any of them irrespective of bodily proportions or structure.

No limitation, other than herein specified, is implied by the drawings submitted herewith, as they only serve to illustrate the preferred application of this method.

Having thus described this invention, I claim:

1. A rule having a graduated edge on opposite faces thereof, each graduated edge having associated therewith primary, major indicia for the unitary graduations progressing successively from one end of said rule, and secondary, minor indicia for the unitary graduations progressing successively from the opposite end.

2. A rule having a graduated edge on opposite faces thereof, each graduated edge having associated therewith primary, major indicia for the unitary graduations progressing successively from one end of said rule, and secondary, minor indicia for the unitary graduations progressing successively from the opposite end, the major indicia and minor indicia on one face, being, in value identical with, respectively, the minor and major indicia on the opposite face.

3. An extensible rule having a graduated surface at one edge only, a major indicia for the unit graduation lines reading from one end of the rule; minor indicia at the opposite edge of the same surface, and reading from the opposite end of the rule with respect to the major indicia and being inverted with respect to the major indicia for the purpose of avoiding confusion in reading of those indices of a pair whose position is such that their values are approximately equal and one could be mistaken for the other when either end of the scale is being used as a base.

4. An extensible rule having a graduated surface at one edge only, the unit graduations terminating just short of the opposite edge, major indicia for the unit graduation lines reading from one end of the rule; minor indicia at the opposite edge of the same surface, and reading from the opposite end of the rule with respect to the major indicia, the individual numbers of the minor indicia disposed on the space between the end of the respective graduation line and the edge of the rule.

5. An extensible rule having a graduated surface at one edge only, major indicia for the unit graduation lines reading from one end of the rule; minor indicia at the opposite edge of the same surface, and reading from the opposite end of the rule with respect to the major indicia and being inverted with respect to the major indicia for the purpose of avoiding confusion in reading of those indices of a pair whose position is such that their values are approximately equal and one could be mistaken for the other when either end of the scale is being used as a base, the major and the minor indicia being of different color so as to facilitate rapidity and increase accuracy of reading of the values.

6. An extensible rule having a graduated surface at one edge of each face and secondary, minor indicia at the opposite edge, primary major indicia intermediate the two edges in a plane substantially median to the rule's width, and a series of indicating characters comprising Arabic numerals, all the digits of which, including 6, 8 and 9, are so formed as to be distinctive for the purpose of identifying the proper reading angle.

7. A sectional rule, having graduations on only one edge of each face, certain sections thereof being foldable over and concealed by others of said sections, major indications for the unitary graduations, progressing successively from one end of said rule, and secondary indications distinctively displayed and arranged in reverse progression with respect to said major indicia to accentuate direction of measurement when some of said rule sections are in folded and concealed position, and assist in the detection of the incomplete unfolding of the rule.

8. A sectional rule, certain sections of which are adapted to be concealed by others of said sections, major indicia for the unitary graduations progressing successively from one end of the rule, and secondary indicia distinctively displayed and arranged in reverse progression with respect to said major indicia to accentuate direction of measurement when certain of said rule sections are in concealed position and assist in the detection of the incomplete unfolding of the rule.

9. A sectional rule having only one graduated edge on opposite faces thereof, major indicia for the unitary graduations on one face progressing successively from one end of said rule, minor indicia closely associated with said major indicia and progressing successively from the opposite end of the rule, the opposite face of the rule bearing major and minor indicia which is transposed with respect to the indicia on the first-mentioned face of the rule.

In testimony whereof I affix my signature.

CHARLES HERRMAN.